(12) United States Patent
Brick et al.

(10) Patent No.: US 6,432,507 B1
(45) Date of Patent: Aug. 13, 2002

(54) LIGHTNING PROTECTION FOR ELECTRICALLY CONDUCTIVE OR INSULATING SKIN AND CORE FOR HONEYCOMB STRUCTURE

(75) Inventors: Rowan O. Brick, Bellevue; Cathleen A. Meyer, Pacific, both of WA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 09/574,547

(22) Filed: May 18, 2000

Related U.S. Application Data

(60) Division of application No. 08/926,767, filed on Sep. 8, 1997, now Pat. No. 6,086,975, which is a continuation-in-part of application No. 08/092,836, filed on Jul. 16, 1993, now abandoned, which is a continuation-in-part of application No. 07/641,846, filed on Jan. 16, 1991, now abandoned.

(51) Int. Cl.⁷ .................................................. B32B 3/12
(52) U.S. Cl. ........................... 428/116; 428/73; 428/75; 428/118; 442/6; 442/21; 442/23; 442/179; 244/121; 244/126
(58) Field of Search .............................. 428/116, 73, 75, 428/118, 595; 442/6, 1, 2, 21, 22, 23, 31, 52, 179, 180

(56) References Cited

U.S. PATENT DOCUMENTS

| | | | | |
|---|---|---|---|---|
| 3,923,421 | A | * | 12/1975 | Carter et al. |
| 4,599,255 | A | * | 7/1986 | Anglin et al. |
| 4,755,904 | A | * | 7/1988 | Brick et al. |
| 6,065,717 | A | * | 5/2000 | Boock |

* cited by examiner

Primary Examiner—Deborah Jones
Assistant Examiner—Wendy Boss
(74) Attorney, Agent, or Firm—Conrad O. Gardner

(57) ABSTRACT

Lightning protection utilizing lightweight electrically conductive coatings with a conductance of approximately 220 to 350 mhos per square co-cured or secondarily bonded to the outer surface of thin skin composite structure. Selection of either 2 to 3 ounces per square yard or aluminum mesh of 1 to 1.5 ounces per square yard, depending on corrosion compatibility, satisfy the conductance requirement and has shown superior lightning protection over heavier weight conductive coatings.

6 Claims, 2 Drawing Sheets

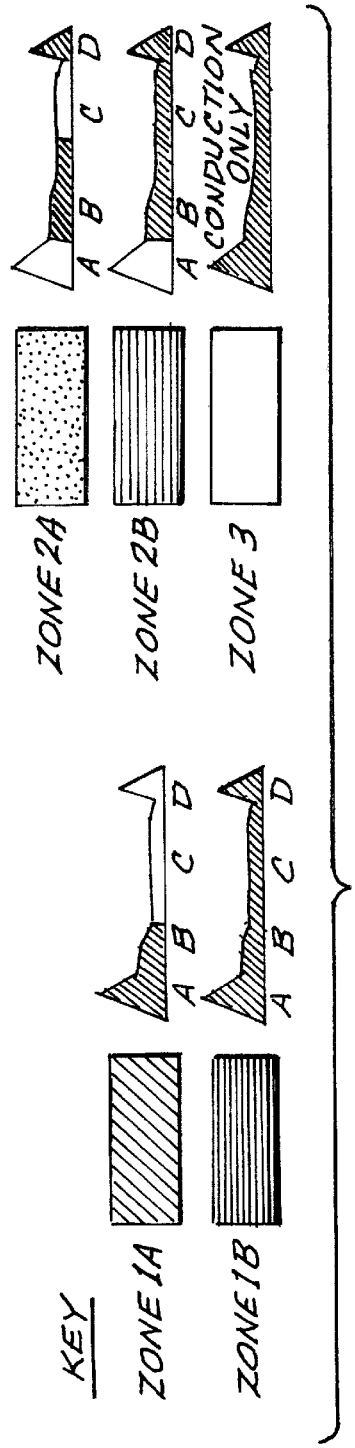
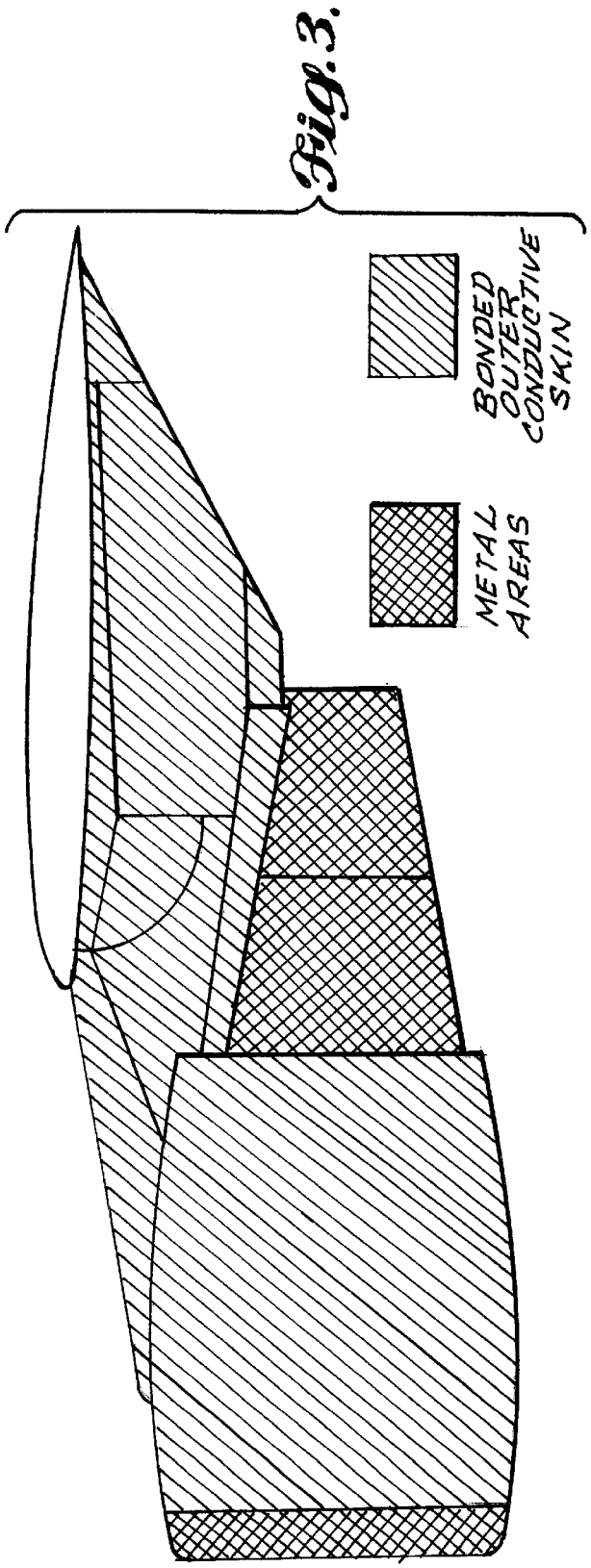

LIGHTNING PROTECTION FOR ELECTRICALLY CONDUCTIVE OR INSULATING SKIN AND CORE FOR HONEYCOMB STRUCTURE

CROSS-REFERENCES TO RELATED APPLICATIONS

This application is a divisional application to continuation-in-part application Ser. No. 08/926,767, filed Sep. 8, 1997, now U.S. Pat. No. 6,086,975, which is a continuation-in-part application of application Ser. No. 08/092,836 filed Jul. 16, 1993, now abandoned which is a continuation-in-part of Ser. No. 07/641,846, filed Jan. 16, 1991, now abandoned.

BACKGROUND OF THE INVENTION

1. Field of the Invention

This invention relates to the prevention of outer skin puncture of thin skin sandwich laminates by direct lightning attachment.

This invention relates to lightning protection systems and, more particularly, to such a system for protecting electrically conductive composite material aircraft structures from puncture that have thin outer skin structure or thin skin sandwich structure. The protection method is to place a controlled electrically conductive layer outwardly of the conductive skin layer and in electrical contact with the conductive skin so as to disperse the current from severe lightning direct attachment, and that has means for preventing puncture of the outer skin surface and minimize damage to the structure.

2. Background Art

Conventional aluminum aircraft structures typically have inherent lightning protection. An aluminum skin structure has uniform and predictable material properties, including the electrical properties. Thus, protection against skin puncture by lightning can be provided simply by sizing the aluminum skin thickness to a range of 0.404 to 0.060 inch. In areas of conventional aircraft structure where the skin is electrically non-conductive, such as radomes and aerodynamic fairings, metal bus bars can be applied to the exterior surface to direct the lightning currents to the aluminum structure.

Providing lightning protection for electrically conductive composite material structure, such as carbon fiber reinforced plastic, is much more difficult and complicated than for typical aluminum structure. Conductive composites are non-homogeneous and are considerably less conductive than aluminum. In thick skin structure, i.e., greater than 0.10 inch, the skin may be thick enough to resist puncture but the structure is still subject to severe skin surface damage, which can be minimized by applying relatively heavy metal or insulating coatings, or a combination in layers, to provide adequate protection as noted in previous patents that deal with thick skin electrically conductive composite structure.

Intuitively, one would expect to use heavier metal meshes to protect thin skin electrically conductive composite structure. However, for electrically conductive thin skin and sandwich composite structure, the structure is easily punctured by lightning attachment even when the heavy metal mesh coatings are used. Using heavier weight coverings comparable to aluminum skin thickness would provide adequate protection but would negate the weight saving advantages of composite structure over that of aluminum.

It is the object of this invention to provide a lightweight single layer protection system that will provide surface protection and prevent puncture of thin skin electrically conductive composite aircraft structure. Previously the primary considerations for the selection of the lightning protection material has been based more upon the mechanical, corrosion and weight aspects of the material.

It is further the object of this invention to select the material based primarily on the electrical properties of the protection layer wherein a narrow window of an electrical property, that is surface conductivity, provides optimum protection for thin skin electrically conductive structure. It is fortuitous that this leads to a lighter weight solution for thin skin conductive composite structure than the current methods used to protect thick skin composite structure. By applying a lighter weight metal mesh that has a controlled electrical surface conductivity which is less than that used for thick skin composite structure, skin puncture from severe lightning strike attachment can be prevented for thin skin electrically conductive composite structure.

The lighter weight conductive coatings would also provide protection for thin skin structure that is non-electrically conductive, with or without electrically conductive core structure.

SUMMARY OF THE INVENTION

Critical features of the present invention include: 1) The selection of the mesh weight based upon the electrical surface conductivity to provide a precisely controlled and efficient protection to prevent puncture of thin skin structure; 2) The heavier more conductive mesh weights do not necessarily provide better lightning protection than the lightweight meshes; 3) For carbon fiber reinforced plastic skins, the electrically conductive layer makes electrical contact with the electrically conductive carbon fiber skin structure to make electrical bonding inherent in the structural makeup.

Another important feature is that the metal mesh layer also provides Electromagnetic Interface (EMI) shielding and when combined with the inner surface foil EMI shielding, a reduction in thickness of the inner surface foil can be made to minimize wrinkling.

BRIEF DESCRIPTION OF THE DRAWING(S)

FIG. 3 is a more detailed showing of cowl and fairings showing areas for incorporating a co-cured or bonded outer conductive ply on honeycomb core or thin skin cowls and fairings, while the metal areas do not require this type of protection; and, FIG. 4 is a key useful in showing the transport aircraft strike zones in the transport aircraft of FIGS. 1 and 2.

DESCRIPTION OF A PREFERRED EMBODIMENT

A preferred embodiment of this invention consists of the use of a lightweight metal mesh with a controlled electrical surface conductivity of 220 to 350 mhos per square co-cured or secondarily bonded to the outer skin surface of thin structure to prevent puncture for the simulated lighting strike test levels. For CFRP, a corrosion compatible copper mesh, mesh weight of 2 to 3 oz. per square yard with a conductance of 220 to 350 mhos per square is sufficient. Heavier weight copper meshes, e.g. 5 to 6 oz. per square yard with a conductance greater than 425 mhos per square, do not provide as much protection as the lighter weight meshes with a conductance of 220 to 350 mhos per square for thin skin structure. For corrosion compatibility with aluminum structure, aluminum meshes of 1 to 1.5 oz. per square yard are electrically equivalent.

Figure 1:
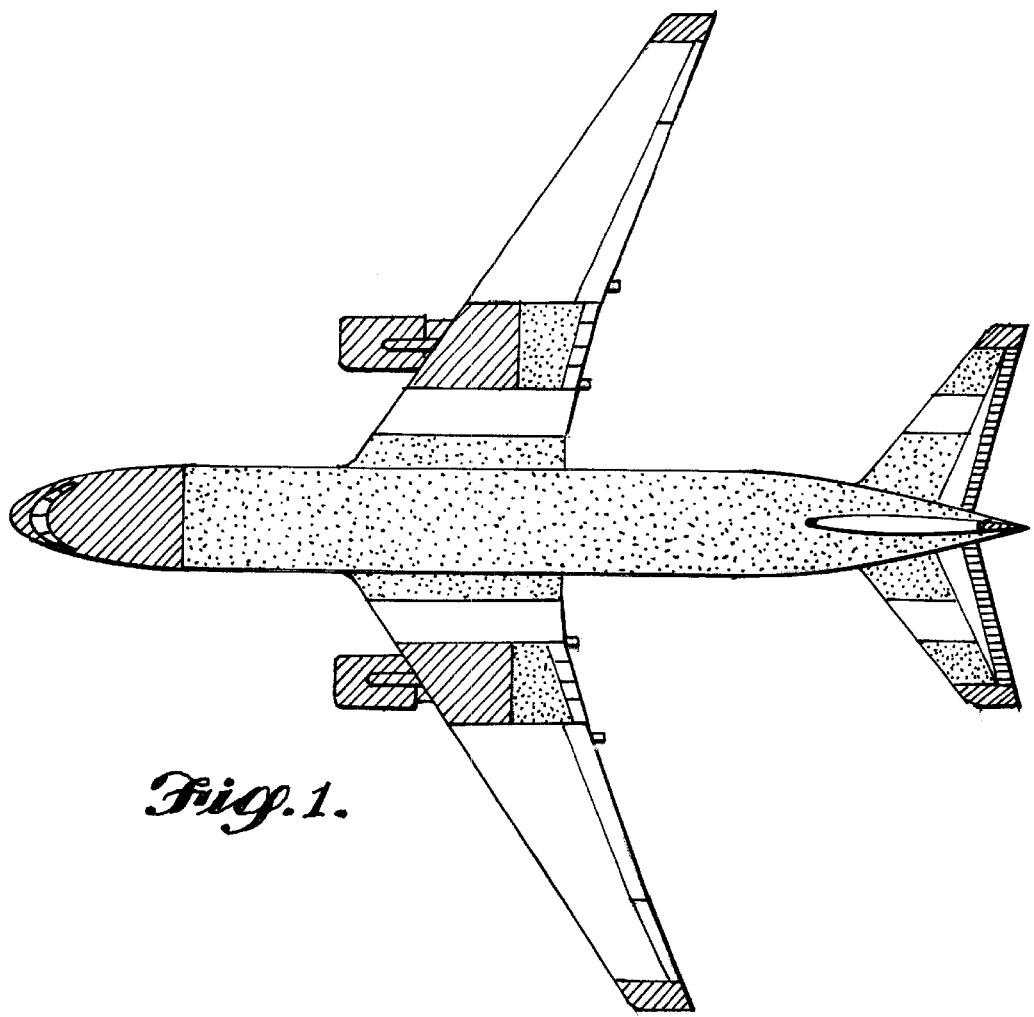
FIG. 1 is a top plan view of an aircraft showing areas for incorporating a co-cured or bonded outer conductive ply on honeycomb core or thin skin cowl and fairings.
Figure 2:
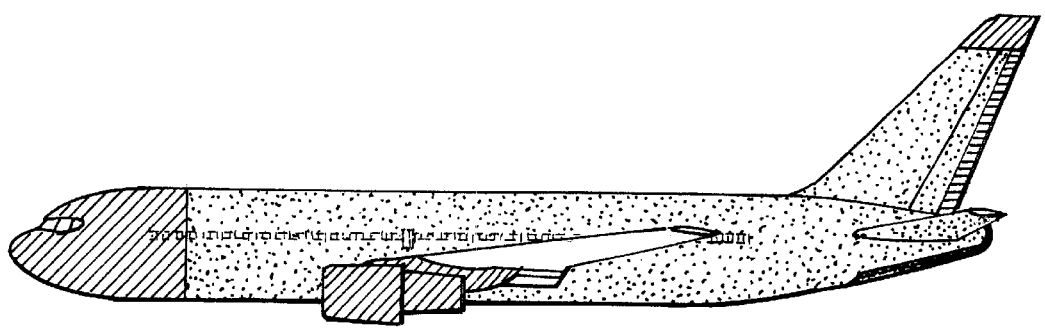
FIG. 2 is a side view of the aircraft of FIG. 1 also showing areas for incorporating a co-cured or bonded outer conductive ply on honeycomb core or thin skin cowl and fairings.

The transport aircraft strike zones of FIGS. 1 and 2 are interpreted through use of the key of FIG. 4. It should also be noted that zone 3 also underlies all other zones.

FIG. 3 shows engine cowl and fairings with accompanying hatching code interpretation of areas that may incorporate a co-cured or bonded outer conductive ply on honeycomb core or thin skin cowl and fairings. Such a protection system could be utilized for any type of lightweight honeycomb structure (aluminum, fiberglass, CFRP) or thin skin structure. Although copper mesh has been hereinbefore described, other lightweight conductive coatings could be utilized as long as it provides the same level of surface conductivity and meets corrosion compatibility specifications.

What is claimed is:

1. A composite aircraft structure comprising a honeycomb core structure having an outer skin surface comprised of carbon fiber reinforced composite structure and a copper metal mesh co-cured or secondarily bonded to said outer skin surface, wherein said honey comb cure structure is:
    i. electrically conductive, or
    ii. electrically non-conductive; and,
    wherein said copper metal mesh has an electrical conductance range of 220 to 350 mhos per square where the specific conductance in said range corresponds to a copper mesh weight of 2 to 3 ounces per square yard.

2. A composite aircraft structure comprising a honeycomb core structure having an outer skin surface comprised of fiberglass reinforced composite structure and a copper metal mesh co-cured or secondarily bonded to said outer skin surface, wherein said honeycomb core structure is:
    i. electrically conductive, or
    ii. electrically non-conductive; and,
    wherein said aluminum metal mesh has an electrical conductance range of 220 to 350 mhos per square where the specific conductance in said range corresponds to a copper mesh weight of 2 to 3 ounces per square yard.

3. A composite aircraft structure comprising a thin skin structure, containing no honeycomb core structure, having an outer skin surface comprised of fiberglass composite structure and a copper metal mesh co-cured or secondarily bonded to said outer skin surface; and,
    wherein said copper metal mesh has an electrical conductance range of 220 to 350 mhos per square where the specific conductance in said range corresponds to a copper mesh weight of 2 to 3 ounces per square yard.

4. A composite aircraft structure comprising a honeycomb core structure having an outer skin surface comprised of carbon fiber reinforced composite structure and an aluminum metal mesh co-cured or secondarily bonded to said outer skin surface, wherein said honeycomb core structure is:
    i. electrically conductive, or
    ii. electrically non-conductive; and,
    wherein said aluminum metal mesh has an electrical conductance range of 220 to 350 mhos per square where the specific conductance in said range corresponds to an aluminum mesh weight of 1 to 1.5 ounces per square yard.

5. A composite aircraft structure comprising a thin skin structure, containing no honeycomb core structure, having an outer skin surface comprised of fiberglass reinforced composite structure and an aluminum metal mesh co-cured or secondarily bonded to said outer skin surface; and,
    wherein said aluminum metal mesh has an electrical conductance range of 220 to 350 mhos per square where the specific conductance in said range corresponds to an aluminum mesh weight of 1 to 1.5 ounces per square yard.

6. A composite aircraft structure comprising a honeycomb core structure having an outer skin surface comprised of fiberglass reinforced composite structure and an aluminum metal mesh co-cured or secondarily bonded to said outer skin surface, wherein said honeycomb core structure is:
    i. electrically conductive, or
    ii. electrically non-conductive; and,
    wherein said aluminum metal mesh has an electrical conductance range of 220 to 350 mhos per square where the specific conductance in said range corresponds to an aluminum mesh weight of 1 to 1.5 ounces per square yard.

* * * * *